(12) United States Patent
Martin et al.

(10) Patent No.: US 7,778,110 B2
(45) Date of Patent: Aug. 17, 2010

(54) PROCESSING SEISMIC DATA REPRESENTATIVE OF THE ACCELERATION WAVEFIELD

(75) Inventors: James Martin, Cottenham (GB); Andreas W. Laake, Kingston (GB)

(73) Assignee: WesternGeco L.L.C., Houston, TX (US)

( * ) Notice: Subject to any disclaimer, the term of this patent is extended or adjusted under 35 U.S.C. 154(b) by 84 days.

(21) Appl. No.: 10/550,704

(22) PCT Filed: Mar. 26, 2004

(86) PCT No.: PCT/GB2004/001378

§ 371 (c)(1),
(2), (4) Date: Jul. 13, 2006

(87) PCT Pub. No.: WO2004/086094

PCT Pub. Date: Oct. 7, 2004

(65) Prior Publication Data

US 2006/0291329 A1     Dec. 28, 2006

(30) Foreign Application Priority Data

Mar. 26, 2003 (GB) ................................. 0306920.0
Sep. 8, 2003 (GB) ................................. 0320943.4

(51) Int. Cl.
*G01V 1/00* (2006.01)
(52) U.S. Cl. .............................. 367/38; 367/52; 367/65
(58) Field of Classification Search ................. 181/102; 367/16, 38, 52, 65
See application file for complete search history.

(56) References Cited

U.S. PATENT DOCUMENTS

| 4,038,876 | A | * | 8/1977 | Morris | 73/1.38 |
|---|---|---|---|---|---|
| 4,353,121 | A | * | 10/1982 | Ray et al. | 367/21 |
| 4,520,467 | A | * | 5/1985 | Berni | 367/24 |
| 4,805,725 | A | * | 2/1989 | Paulsson | 181/106 |
| 4,850,449 | A | * | 7/1989 | Cheung | 181/101 |
| 4,979,150 | A | * | 12/1990 | Barr | 367/24 |
| 5,005,665 | A | * | 4/1991 | Cheung | 181/101 |
| 5,067,112 | A | * | 11/1991 | Meek et al. | 367/43 |
| 5,080,190 | A | * | 1/1992 | Owen et al. | 181/122 |
| 5,251,183 | A | * | 10/1993 | McConnell et al. | 367/21 |

(Continued)

FOREIGN PATENT DOCUMENTS

FR         2553522        10/1983

(Continued)

OTHER PUBLICATIONS

Ming et al. The measurement of structural mobilities of a circular cylindrical shell. J. Acoust. Soc. Am. 107(3), Mar. 2000. pp. 1374-1382.*

(Continued)

*Primary Examiner*—Jack Keith
*Assistant Examiner*—Krystine Breier

(57) ABSTRACT

A method of processing seismic data comprises processing data representative of the acceleration wavefield so as to obtain information about the earth's subsurface direct from the seismic data representative of the acceleration wavefield. In conventional techniques for processing seismic data representative of the acceleration wavefield the data are transformed to the velocity domain at an early stage in the processing. The invention enables the transform step to be eliminated, thereby simplifying the processing and eliminating the risk that the transform might degrade the data. Furthermore, the increased sensitivity at high frequencies of a typical acceleration sensor compensates for the low-pass filter effect of the earth.

16 Claims, 9 Drawing Sheets

U.S. PATENT DOCUMENTS

| | | | | |
|---|---|---|---|---|
| 5,377,161 | A | * | 12/1994 | Meehan .................... 367/82 |
| 5,392,213 | A | * | 2/1995 | Houston et al. ............... 702/17 |
| 5,642,327 | A | * | 6/1997 | Schiflett et al. ............... 367/47 |
| H001693 | H | * | 11/1997 | Thornton et al. .............. 702/17 |
| 5,719,821 | A | * | 2/1998 | Sallas et al. .................. 367/41 |
| 5,818,795 | A | * | 10/1998 | Hawkins et al. ............... 367/21 |
| 5,894,450 | A | * | 4/1999 | Schmidt et al. ............. 367/134 |
| 5,971,095 | A | | 10/1999 | Ozbek |
| 6,122,959 | A | * | 9/2000 | Hoshal et al. ................. 73/489 |
| 6,125,698 | A | * | 10/2000 | Schweitzer et al. ....... 73/382 G |
| 6,151,556 | A | * | 11/2000 | Allen .......................... 702/18 |
| 6,161,076 | A | * | 12/2000 | Barr et al. ..................... 702/17 |
| 6,166,994 | A | * | 12/2000 | Jeffryes ....................... 367/57 |
| 6,212,952 | B1 | * | 4/2001 | Schweitzer et al. ....... 73/382 G |
| 6,366,531 | B1 | * | 4/2002 | Varsamis et al. .............. 367/26 |
| 6,382,332 | B1 | * | 5/2002 | Eaton .......................... 175/50 |
| 6,430,105 | B1 | | 8/2002 | Stephen |
| 6,430,510 | B1 | * | 8/2002 | Thomas et al. ................ 702/14 |
| 6,446,008 | B1 | * | 9/2002 | Ozbek ......................... 702/17 |
| 6,460,803 | B1 | * | 10/2002 | Kiss et al. ..................... 244/54 |
| 6,512,980 | B1 | * | 1/2003 | Barr ............................. 702/1 |
| 6,532,190 | B2 | | 3/2003 | Bachrach ..................... 367/25 |
| 6,611,764 | B2 | * | 8/2003 | Zhang ......................... 702/18 |
| 6,651,007 | B2 | * | 11/2003 | Ozbek ......................... 702/17 |
| 6,697,302 | B1 | * | 2/2004 | Cray et al. .................. 367/141 |
| 6,791,901 | B1 | * | 9/2004 | Robertsson et al. ........... 367/58 |
| 6,868,038 | B2 | * | 3/2005 | Leaney ........................ 367/57 |
| 6,876,599 | B1 | * | 4/2005 | Combee ...................... 367/21 |
| 6,883,638 | B1 | * | 4/2005 | Maxwell et al. ............. 181/102 |
| 6,894,948 | B2 | * | 5/2005 | Brittan et al. ................. 367/24 |
| 7,003,402 | B2 | * | 2/2006 | Christie et al. ................ 702/14 |
| 7,123,543 | B2 | * | 10/2006 | Vaage et al. .................. 367/24 |
| 7,164,619 | B2 | * | 1/2007 | Robertsson et al. ........... 367/21 |
| 7,239,577 | B2 | * | 7/2007 | Tenghamn et al. ............ 367/15 |
| 2002/0129653 | A1 | | 9/2002 | Seth |
| 2004/0049349 | A1 | * | 3/2004 | Wood .......................... 702/17 |
| 2004/0070529 | A1 | | 4/2004 | Kamas et al. ................ 341/155 |
| 2004/0109389 | A1 | * | 6/2004 | Quinn et al. ................. 367/144 |
| 2005/0024990 | A1 | | 2/2005 | Laake .......................... 367/38 |
| 2005/0090987 | A1 | * | 4/2005 | Amundsen et al. ............ 702/14 |
| 2005/0152220 | A1 | * | 7/2005 | Kritski et al. ................. 367/38 |
| 2006/0018192 | A1 | * | 1/2006 | Jeffryes et al. ................ 367/41 |
| 2006/0142946 | A1 | * | 6/2006 | Goujon et al. ................ 702/18 |
| 2006/0262645 | A1 | * | 11/2006 | Van Baaren .................. 367/54 |
| 2006/0291329 | A1 | * | 12/2006 | Martin et al. ................. 367/38 |

FOREIGN PATENT DOCUMENTS

| | | |
|---|---|---|
| GB | 2 309 082 | 7/1997 |
| WO | WO 0153854 A1 | 7/2001 |
| WO | WO 02059647 A1 | 8/2002 |
| WO | WO 03023451 A1 | 3/2003 |
| WO | WO 03062858 A1 | 7/2003 |

OTHER PUBLICATIONS

International Search Report dated Jul. 28, 2004, for Application No. PCT/GB2004/001378.

UK Search Report dated Oct. 16, 2003, for Application No. GB 0320943.4.

* cited by examiner

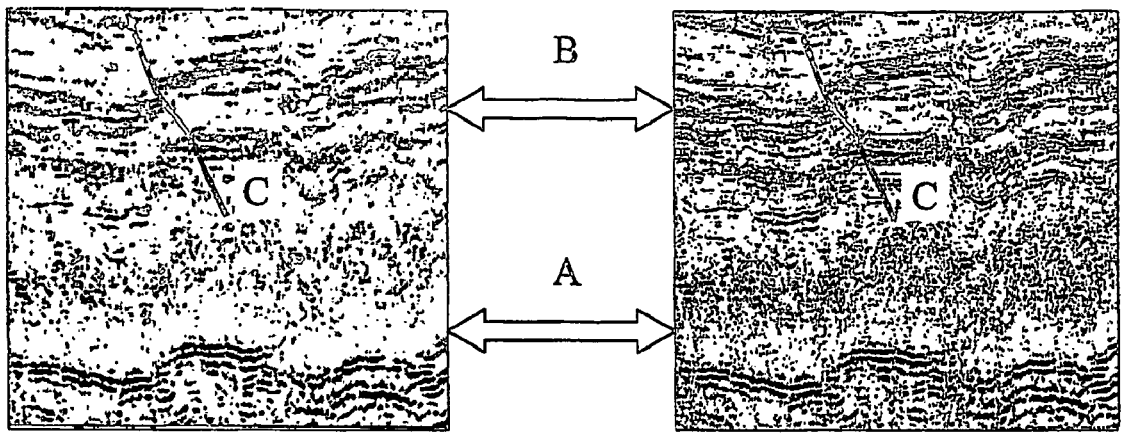
Low frequency image
High frequency image
FIG 1 (a)
FIG 1 (b)
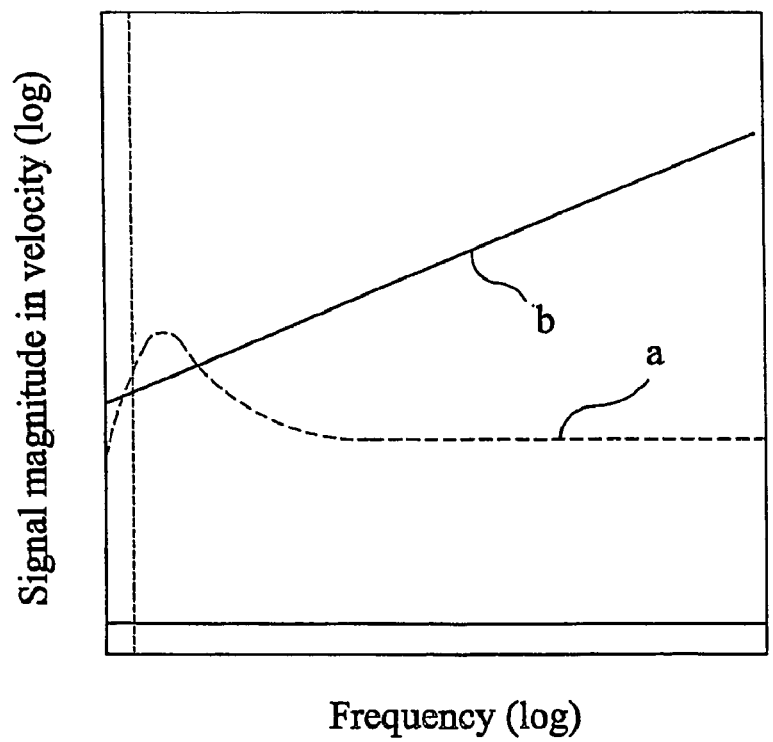
Frequency (log)
Sensor type:
--------- Velocity sensor  a
———— Acceleration sensor  b
FIG 2

Source offset
——— Source signal (a)
- - - - - Near offset receiver (b)
—·—·— Far offset receiver (c)

Signal domain:
- - - - - Velocity domain (a)
——— Acceleration domain (b)

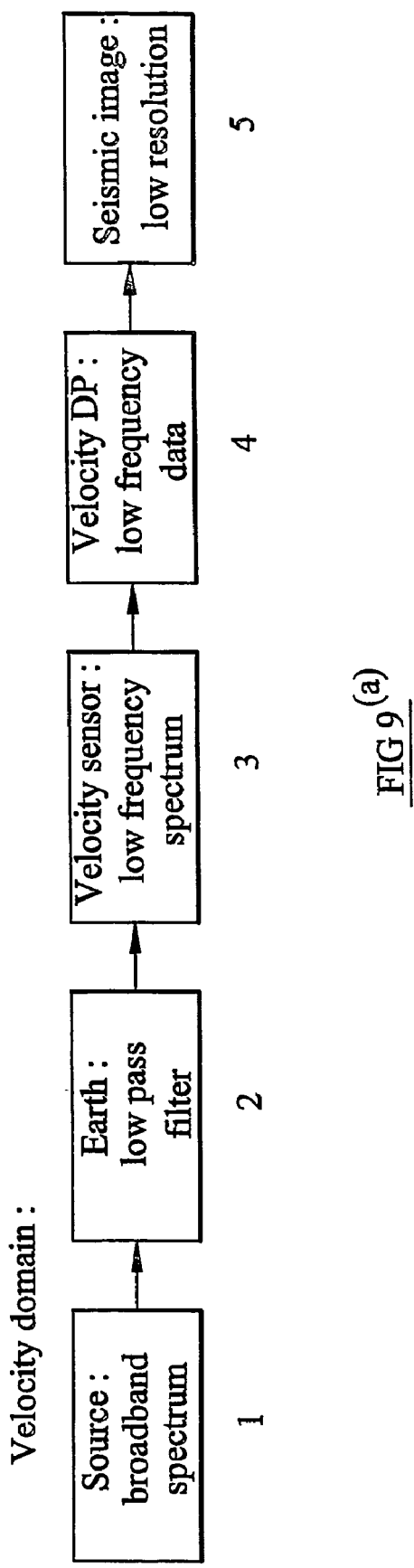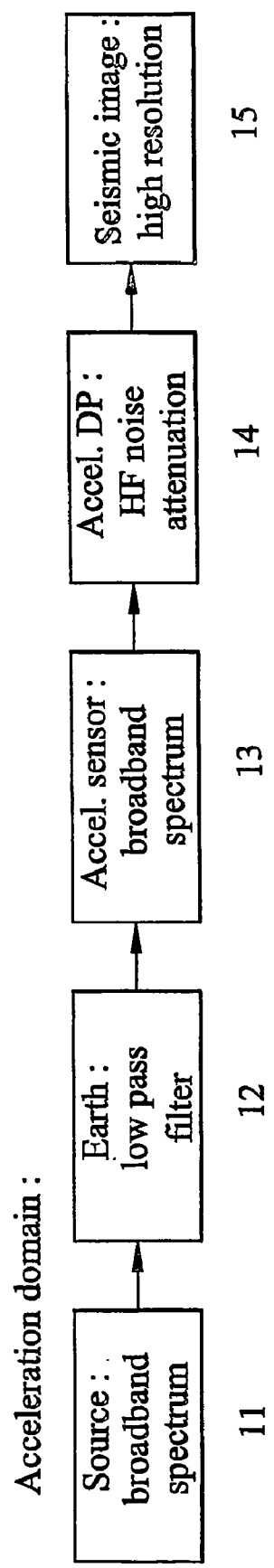
FIG 9(a)
FIG 9(b)

PROCESSING SEISMIC DATA REPRESENTATIVE OF THE ACCELERATION WAVEFIELD

The present invention relates to processing seismic data, and it particularly relates to processing seismic data that represents the acceleration wavefield.

The intention in acquiring and processing seismic data is to generate an image of subsurface structures and so obtain information about the structure of the earth's interior. In a seismic survey seismic energy is generated and transmitted into the earth, and reflected seismic energy is detected by a seismic acquisition system that includes one or more seismic energy sensors.

When seismic data are processed to give a subsurface image, one factor on which the quality of the subsurface image depends is the frequency range of the seismic waves recorded by the seismic acquisition system. This is illustrated in FIGS. 1(a) and 1(b). FIG. 1(a) and FIG. 1(b) show images of the same region of the earth's interior, with the image of FIG. 1(a) being obtained from only low frequency seismic data and the broadband image of FIG. 1(b) being obtained using both high frequency and low frequency seismic data. Typical frequency ranges are 5 to 15 Hz for the low frequency image of FIGS. 1(a) and 5 to 80 Hz for the high resolution, broadband image of FIG. 1(b). These figures show the importance of high frequency data for the quality of the subsurface seismic image. It will be seen at once that the image of FIG. 1(b) is generally sharper and has higher resolution than the image of FIG. 1(a). Broad structures, such as those labelled "B", do not suffer significantly from low frequency recording. Finely structured events, such as those labelled "A", however, are not resolved in the low frequency image of FIG. 1(a), whereas the high frequency image of FIG. 1(b) clearly shows all details of these structures. Furthermore, distinctive events such as the fault labelled "C" show degradation in delineation in the low frequency image of FIG. 1(a).

One commonly-used seismic sensor is the geophone. Geophones have been used for many years in both sea-floor and land-based seismic data acquisition systems to measure the incident seismic wavefield. Geophones are regarded as velocity sensing devices, in that they measure the seismic velocity wavefield. Thus, it has become accepted in the seismic industry that the images of the subsurface structures obtained from seismic data acquired by geophones are effectively measures of the velocity wavefield.

Recently, seismic sensors that measure the acceleration wavefield rather than the velocity wavefield have been developed. Examples of these are the GAC sensor (a geophone accelerometer from Schlumberger) disclosed in JP 06 027 135 A and WO02/18975, the Vectorseis sensor (an accelerometer made by Input/Output Inc and described in WO 00/55646) and the GeoSil sensor (an acceleration seismic sensor from Schlumberger). These acceleration sensors acquire seismic data that is essentially a measure of the acceleration wavefield rather than the velocity wavefield, and so provide the opportunity to record and process acceleration data instead of velocity data.

There have been other reports of acceleration sensors. For example, WO00/55638 describes a seismic sensor design and process for measuring acceleration data. U.S. Pat. No. 5,268,878 is directed to an accelerometer sensor having a reduced periodic noise at a first frequency.

FIG. 2 is a comparison between the output (trace b, shown as a full line) of a seismic sensor that measures the acceleration wavefield (hereinafter an "acceleration sensor") and the output of a conventional velocity wavefield-sensing geophone (trace a, shown as a broken line). FIG. 2 shows the output of each sensor when a seismic wavefield having an amplitude that is constant with frequency over the frequency range shown in FIG. 2 is incident on the sensor. (Both the sensor output and the frequency are on logarithmic scales in FIG. 2.) It will be seen that the output of the geophone initially rises to a slight peak, declines slightly, and then remains generally constant as the frequency of the incident wavefield increases. Thus, the geophone has a substantially constant sensitivity over the frequency range shown in FIG. 2.

The output of the accelerometer, however, rises with increasing frequency of the incident wavefield. This indicates that the sensitivity of the accelerometer increases as the frequency of the incident wavefield increases. At low frequencies the geophone and the accelerometer have approximately equal sensitivity, but at high frequencies the accelerometer has a greater sensitivity than the geophone. Acceleration sensors are therefore preferred for high-resolution seismic imaging, since they can capture the high frequency data necessary to obtain a high-resolution image.

U.S. Pat. Nos. 4,951,264 and 4,807,199 are directed to a method of measuring the shear modulus profile of a seabed floor. The method is a passive method, in that the shear modulus of the seabed is obtained from the displacement of the seabed that occurs as a result of gravity waves in the sea. These documents describe using a sensor package containing a pressure sensor and three seismometers to obtain pressure data and seabed velocity or acceleration data. The shear modulus profile of the sea-bed is determined from the pressure data and the seabed velocity or acceleration data.

U.S. Pat. No. 6,430,105 discloses a multi component seismic sensor package which contains three orthogonal accelerometers for determining the orientation of the sensor package. The sensor package may further include velocity-sensing geophones for acquiring seismic data, or the accelerometers may alternatively be used to acquire seismic data. No details of the processing of the accelerometer data are given.

WO00/55646 discloses a method of operating and testing a sensor assembly that includes accelerometers with axes of sensitivity orthogonal to each other. The method preferably includes determining sensor tilt angle, determining the position of the sensor, and synchronising the operation of the sensor.

The present invention provides a method of processing seismic data representative of the acceleration wavefield thereby to obtain information about the earth's subsurface direct from the seismic data representative of the acceleration wavefield.

While acceleration sensors have been used in seismic data acquisition since the early 1990's it has hitherto been the practice to transform acquired acceleration data to velocity data as the initial step in processing the acquired data. Further processing of the data to obtain an image of the earth's subsurface is carried out on the velocity data obtained by transforming the acceleration data.

Transforming the acceleration data to velocity data aids in comparing the data with data acquired in the past using conventional velocity sensitive geophones. It also reflects the conventional tendency in both borehole and land seismic data acquisition to assume that, in view of the relatively flat sensitivity shown in trace (a) of FIG. 2, use of a velocity-sensing geophone provides seismic data with the broadest signal bandwidth and the flattest spectrum, so giving the most reliable seismic data for interpretation.

The inventors have realised, however, that an image of the earth's sub-surface may be obtained direct from acceleration data. The conventional step of transforming acceleration data to velocity data may be eliminated, and the elimination of the transform step simplifies the processing. Moreover the transform step can degrade the data, and eliminating the transform step thus provides a further advantage.

Furthermore, using acceleration data to obtain a sub-surface image provides an advantage over the use of velocity data. Although the increasing sensitivity of an accelerometer with frequency may initially appear to be less satisfactory than the substantially constant sensitivity of a velocity sensor, it has been realised that the increased sensitivity at high frequencies compensates for the low-pass filter effect of the earth.

The method may comprise the step of attenuating noise in a high frequency range in the seismic data. The increased sensitivity at high frequencies of an acceleration-sensing receiver means that the amplitude of high-frequency ambient noise is also increased, and thus it is desirable to attenuate the high-frequency noise. The step of attenuating noise in the high frequency range in the seismic data may for example comprise a point source-point receiver noise attenuation step.

A second aspect of the invention provides a method of seismic surveying comprising: actuating a seismic source to emit seismic energy; acquiring seismic data representative of the acceleration wavefield using a seismic receiver spaced from the seismic source; and processing the seismic data according to a method of the first aspect.

A third aspect of the present invention provides an apparatus for processing seismic data representative of the acceleration wavefield thereby to obtain information about the earth's subsurface direct from the seismic data representative of the acceleration wavefield.

The apparatus may comprise a programmable data processor.

A fourth aspect of the invention provides a seismic surveying arrangement comprising a seismic source for emitting seismic energy; a seismic receiver for acquiring seismic data representative of the acceleration wavefield, the seismic receiver being spaced from the seismic source; and an apparatus according to the third aspect for processing seismic data acquired by the receiver.

The seismic source and the receiver may each disposed at or on the earth's surface, or the seismic source may be disposed at or on the earth's surface and the receiver may be disposed within a borehole. In these seismic surveying arrangements, the improved sensitivity at high frequencies compensates for the low pass filter effect of the earth.

Alternatively, the seismic source may be disposed in a water column and the receiver may be located at the base of the water column or within a borehole. In these seismic surveying arrangements, the improved sensitivity at high frequencies compensates for the low-frequency bias of the amplitude-frequency spectrum of a typical marine seismic source.

A fifth aspect of the invention provides a storage medium containing a program for the data processor of an apparatus according to the third aspect.

A sixth aspect of the invention provides a storage medium containing a program for controlling a programmable data processor to carry out a method of the first aspect.

A seventh aspect of the invention provides a program for controlling a computer to carry out a method of the first aspect.

A preferred embodiment of the present invention will now be described with reference to the accompanying Figures in which:

FIG. 1(a) is a low-frequency image of the earth's subsurface;

FIG. 1(b) is a high frequency image of the earth's subsurface at the same location as the image of FIG. 1(a);

FIG. 2 is a comparison of the output spectrum for a velocity sensor and the output spectrum for an acceleration sensor;

FIG. 9(a) is a schematic flow diagram of the processing of seismic data representing the velocity wavefield;

FIG. 9(b) is a schematic flow diagram of the processing of seismic data representing the acceleration wavefield;

In the method of the present invention seismic data acquired in the acceleration domain are processed directly in the acceleration domain in order to obtain information about the earth's sub-surface. The prior art step of transforming the seismic data from the acceleration domain to the velocity domain is thus eliminated. As well as simplifying the processing, the invention also provides improved information at high frequencies since processing in the acceleration domain compensates for the low-pass filter effect of the earth.

Seismic energy emitted by a typical seismic source has a broadband spectrum which has a substantially constant amplitude over the frequency range of the source. To assist in the rejection of noise, the source spectrum is usually defined by a high-pass band filter that cuts off frequencies below a low cut-off frequency $f_L$ of typically 3 to 5 Hz and by a low band-pass filter that cuts off frequencies above an upper cut-off frequency $f_H$ of typically 60 to 120 Hz. However, although the seismic energy is emitted with a substantially flat spectrum the seismic energy suffers attenuation as it propagates through the earth, and the degree of attenuation is frequency-dependent. This is illustrated in FIG. 3.

Figure 3:
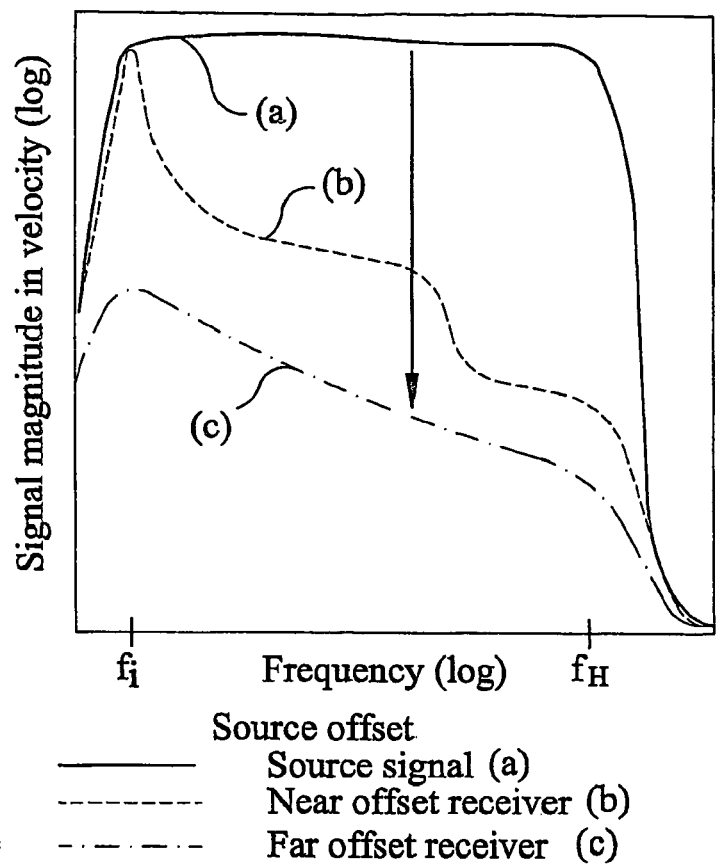
FIG. 3 shows the low pass filter effect of the earth on a seismic signal.

Trace (a) in FIG. 3 shows the amplitude-frequency spectrum of seismic energy emitted by a typical source, with both the amplitude and frequency being represented on logarithmic scales. As explained above, the spectrum is substantially flat between a low cut-off frequency $f_L$ and a high cut-off frequency $f_H$.

Trace (b) of FIG. 3 illustrates the spectrum of seismic energy from the source after travelling through the earth to a receiver located near to, although separated from, the source. It will be seen that the seismic energy has undergone frequency dependent attenuation, with the attenuation generally increasing with frequency. Trace (c) illustrates the spectrum of seismic energy from the source after further travel through the earth, to a receiver located distant from the source, and it will be seen that the seismic energy has undergone further attenuation with the attenuation again generally increasing with frequency. Thus, the spectrum of seismic energy incident on a receiver in a seismic survey will be different to the original spectrum of the seismic energy emitted by the source.

In particular, the high frequency content of the seismic energy incident on a receiver will be significantly reduced compared to the high frequency content of the seismic energy as emitted by the source.

When the receiver is a conventional velocity sensor, having a generally flat sensitivity as shown by curve (a) of FIG. 2, the frequency content of the output from the receiver will correspond to curve (b) or curve (c), depending on the receiver's distance from the source. In essence the earth acts as a low pass filter for seismic data, thus reducing the resolution of the final image of the subsurface that can be obtained from the data (since, as shown by FIGS. 1(a) and 1(b), the high-frequency component of the seismic data is important for good resolution of the final image).

The present invention recognises that, for sea-floor, land and borehole seismic data measurements of the acoustic and elastic wavefields, measurements of the acceleration wavefield provide seismic data with the desired flattest spectrum. This is because the increased sensitivity at high frequencies of an accelerometer (curve (b) in FIG. 2) compensates for the attenuation of the high frequency content of the seismic energy that occurs as the seismic energy propagates through the earth. This is shown schematically in FIG. 4.

Figure 4:
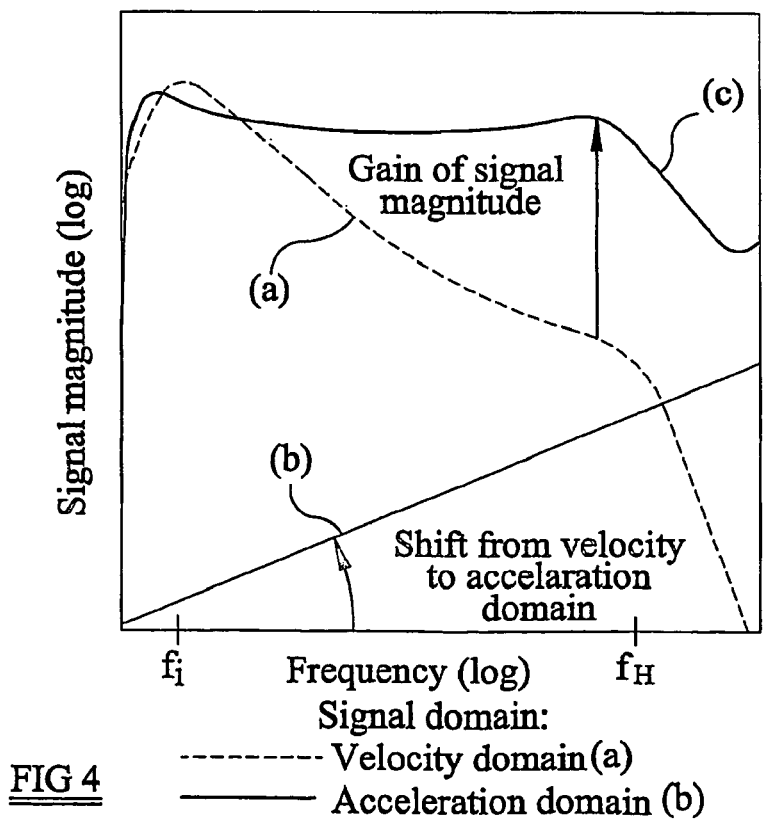
FIG. 4 shows the effect of acceleration recording on the frequency bandwidth of seismic data.

Trace (a) of FIG. 4 shows, as a function of frequency, the amplitude of seismic energy incident on a receiver in a typical seismic survey. Trace (a) of FIG. 4 corresponds generally to trace (c) of FIG. 3. Again, FIG. 4 shows both amplitude and frequency on a logarithmic scale.

Trace (b) of FIG. 4 shows the sensitivity of a typical accelerometer, and corresponds to trace (b) of FIG. 2. Trace (c) of FIG. 4 shows the result of multiplying trace (a) by trace (b), and thus indicates the output that would be obtained when seismic energy having a frequency spectrum of trace (a) is incident on an accelerometer having the sensitivity characteristics of trace (b). It will be seen that the increased sensitivity of the accelerometer at high frequencies compensates for the reduced high frequency content of the seismic energy incident on the receiver, so that the accelerometer output of trace (c) is substantially flat over much of the range between $f_L$ and $f_H$. The accelerometer output trace (c) has an increased amplitude at high frequencies, compared to the high frequency content that would have been obtained if a geophone had been used, and so it is possible to obtain a high-resolution image of the earth's subsurface from the data acquired by the accelerometer.

Figure 6:
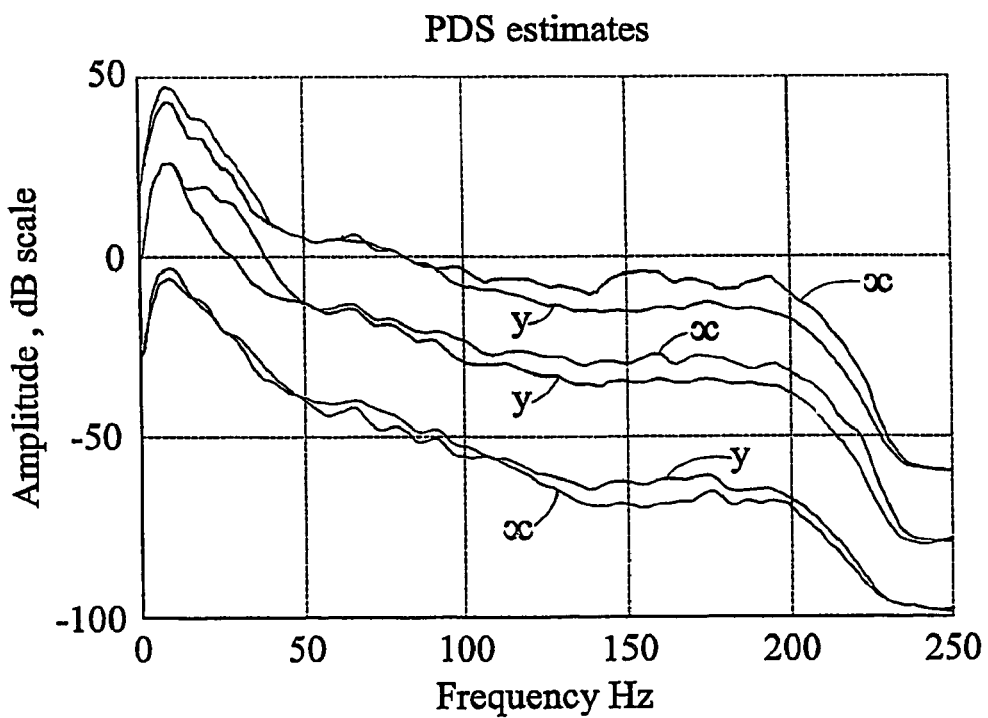
FIG. 6 shows typical amplitude-frequency spectra of sea-floor seismic data acquired using velocity sensitive recording sensors.

FIG. 6 shows frequency spectra obtained in a sea-floor marine survey in which velocity-sensing receivers (in this case geophones) are disposed on the sea-floor. The amplitude is shown on a logarithmic scale, in decibels. The traces represent the output from the velocity sensors, and the frequency spectrum of each of the traces is therefore similar to the frequency spectrum of seismic energy incident on the receivers. Both the x- and y-components of the velocity wavefield acquired by the sensors are shown. Results are shown for the outputs from three different shots, with each shot having a different source-to-receiver distance. While the signal to noise ratio of the data is good across a considerable bandwidth of the data, most of the seismic energy in the traces is below 50 Hz. The amplitude of the every trace falls off towards high frequencies and, as a result, a subsurface image obtained from the traces would have a low resolution. Traces having a similar form would be obtained in a seismic survey in which velocity sensitive geophones are disposed within a borehole in the earth.

Figure 7:
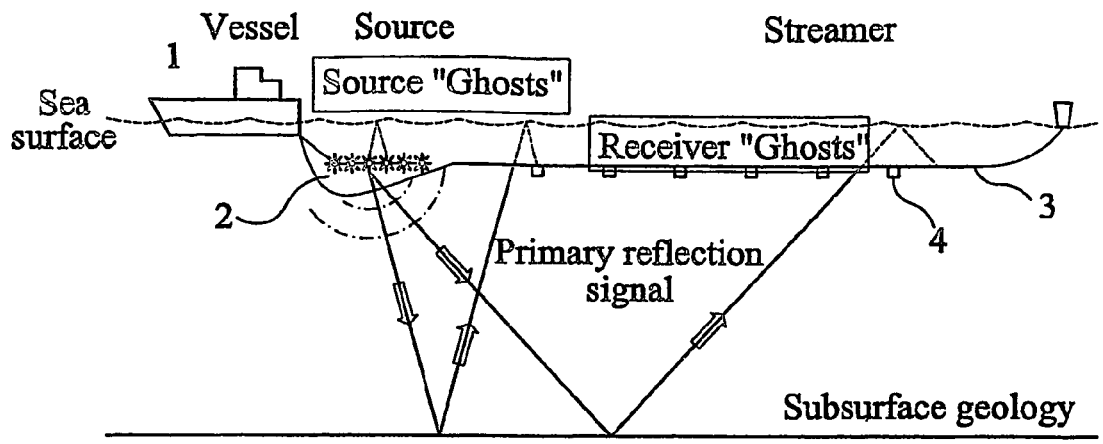
FIG. 7 is a schematic illustration of a towed marine seismic surveying arrangement.

Part of the reason for the frequency spectrum of the traces shown in FIG. 6 is that a seismic source intended for use in a marine seismic survey is designed and tuned to deliver seismic energy with as flat a frequency spectrum as possible in a towed marine seismic survey, in which pressure sensing devices are disposed on streamers that are towed some 6 metres or so beneath the water surface. In a towed marine seismic survey "ghost notches" occur in the frequency spectrum of seismic energy, as a result of reflection of seismic energy at the sea-surface. This is illustrated in FIG. 7, which is a schematic illustration of a towed marine seismic survey.

In brief in a towed marine seismic survey a survey vessel 1 tows a seismic source array 2 through the water, and the source array 2 is periodically actuated to emit seismic energy. The survey vessel also tows a streamer 3 on which a plurality of seismic receivers 4 are disposed and the receivers detect seismic energy from the source array 2. When the source array is actuated to emit seismic energy, some will be emitted upwards and will undergo reflections at the sea surface. The seismic wavefield received at a point below the source will therefore contain one component that has come direct from the source array and another component that has come via reflection at the sea surface. The overall seismic wavefield is the sum of these two components. Reflection at the sea-surface involves a phase change of $\pi$, so that the two components destructively interfere at some frequencies, leading to "ghost notches" in the frequency spectrum at these frequencies. The frequencies at which destructive interference occurs depend on the depth of the source array below the sea surface. Constructive interference occurs at other frequencies, leading to maxima in the amplitude of the seismic wavefield at frequencies half-way between adjacent notch frequencies.

The receivers are also positioned below the sea surface. Thus, seismic energy reflected by a target geological structure may travel direct to a receiver or it may travel to a receiver via a reflection at the sea-surface. Interference again occurs between the two paths, and this gives rise to ghost notches in the seismic wavefield incident on the receivers at frequencies that depend on the depth of the receivers below the sea-surface. Each notch may be though of as the convolution of the source spectrum with a "ghost filter".

Figure 8:
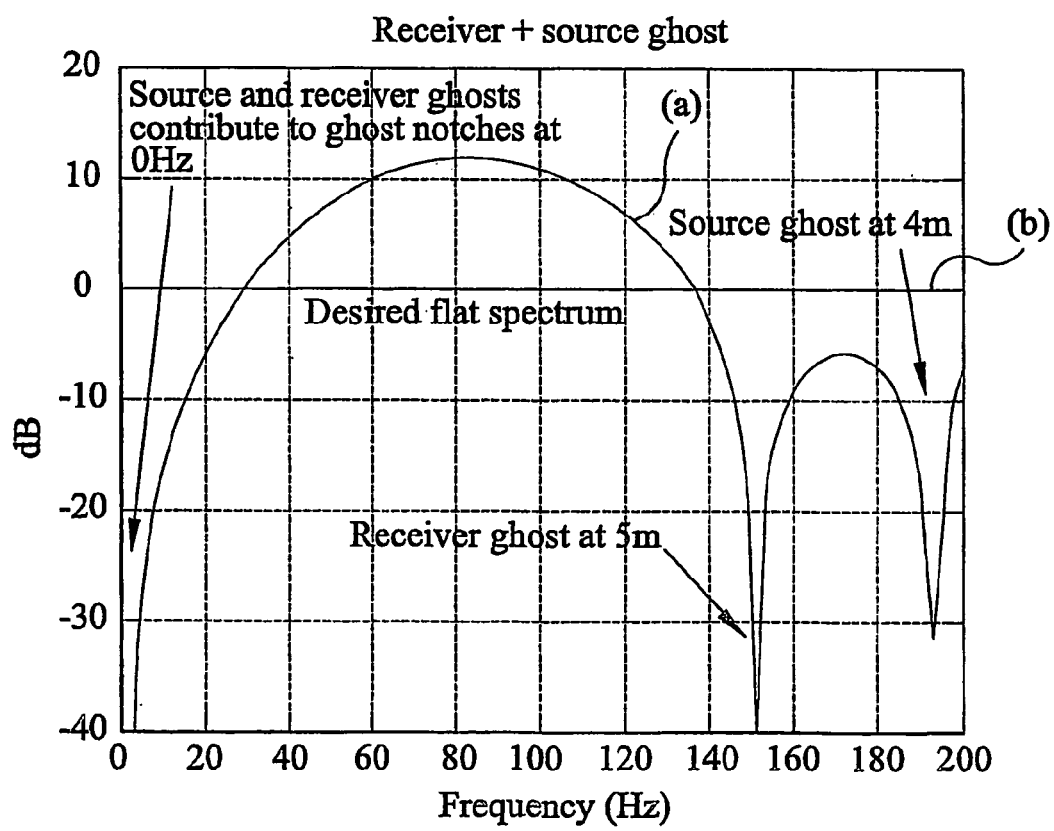
FIG. 8 shows a typical amplitude-frequency spectrum in a towed marine seismic surveying arrangement.

A frequency of 0 Hz is always a notch frequency in the case of a source or receiver that is below the sea-surface. If, therefore, a source that generates a seismic wavefield having a flat amplitude-frequency spectrum were used in a marine seismic survey, the resultant wavefield at the receiver would have an amplitude-frequency spectrum of the form shown in trace (a) of FIG. 8 (which again shows the amplitude on a logarithmic scale). The spectrum contains a ghost notch at a high frequency that is dependent on the source depth (in this example at approximately 190 Hz), a ghost notch at a high frequency that is dependent on the receiver depth (in this example at approximately 150 Hz), and a notch at 0 Hz. The amplitude has a maximum at approximately 80 Hz, owing to constructive interference.

The ghost notches distort the frequency spectrum of the emitted seismic energy. In a towed marine seismic survey it is therefore customary to use a source that emits a seismic wavefield having a frequency spectrum that has a high amplitude at low frequencies. The intention is that the convolution of the source spectrum with the ghost notches and source notches should produce a spectrum that corresponds, as far as possible, to the desired flat spectrum shown as trace (b) in FIG. 8.

In a seismic survey in which receivers are disposed on the sea-floor or in a borehole in the earth, the receiver ghost notch is not present because data is acquired either at the sea-floor or in the borehole for marine acquisition. This, only one ghost filter is applied to the data, from the source ghost. The receiver ghost filter is not applied. If the seismic source used has a frequency spectrum that is designed to provide a flat spectrum after convolution with a source ghost filter and a receiver ghost filter, the result when only the source ghost filter is applied is that spectrum is biased towards low frequencies. Consequently, when sea-floor and borehole marine seismic data are acquired using a seismic source intended for a towed marine array the acquired data are biased towards low frequencies and are deficient in high frequencies. The method of the invention, in which data are acquired and processed in the acceleration domain is therefore advantageous when applied to such data, since the increased sensitivity of the accelerometer at high frequencies compensates for the bias towards low frequencies in the acquired seismic wavefield. Thus, seismic data representing the acceleration wavefield and acquired at the sea-floor or in the borehole will have a spectrum that is close to the desired flat spectrum.

When considering the dynamic range of the data used for subsurface seismic imaging, it is also necessary to considered the noise in the seismic signal. Noise manifests itself in seismic data in two ways:

system quantisation noise, from which no signal can be recovered; and
ambient noise, from which signal may be recovered during the data processing.

When seismic data are acquired using an accelerometer the system noise is unaffected. However, the high frequency ambient noise level increases when seismic data are acquired using an acceleration sensor. This is shown in FIG. 5.

Figure 5:
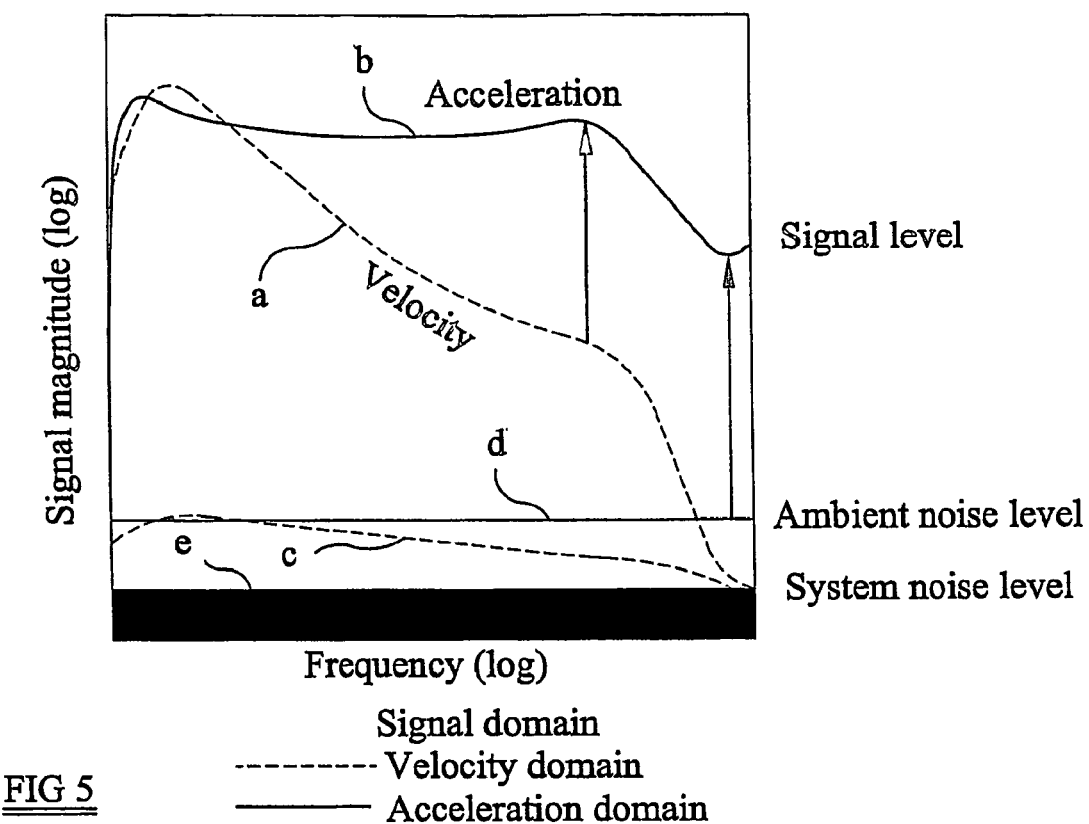
FIG. 5 shows the effect of acceleration domain recording and processing on signal dynamic range.

Trace (a) in FIG. 5 shows the amplitude-frequency spectrum of seismic energy incident on a receiver distant from the seismic source (with the amplitude and frequency both represented on logarithmic scales), and corresponds to trace (c) of FIG. 3 or trace (a) of FIG. 4. Trace (b) of FIG. 5 represents the output from an acceleration sensor when seismic energy having the frequency spectrum of trace (a) is incident on the acceleration sensor, and corresponds to trace (c) of FIG. 4.

Trace (c) of FIG. 5 represents the frequency spectrum of ambient noise. Trace (d) represents the output produced by an acceleration sensor when the ambient noise of trace (c) is input, and it will be seen that the increased sensitivity of the accelerometer also increases the amplitude at high frequencies of the output noise signal. (In comparison, the output noise signal from a velocity sensor having the flat sensitivity of trace (a) of FIG. 2 would be similar to the ambient noise trace (c).)

Finally, trace (e) of FIG. 5 shows the frequency spectrum of the system noise level. This noise is generated in the data acquisition system after data has been acquired by the receiver, and so is independent of whether an acceleration-sensing receiver or a velocity-sensing receiver is used.

The processing flow for acceleration data needs to take account of the attenuation of the relatively higher ambient noise level at higher frequencies. FIG. 9(*a*) shows a typical data flow for velocity domain acquisition and processing of seismic data, and FIG. 9(*b*) shows a typical data flow for acceleration domain acquisition and processing of seismic data.

In the conventional velocity domain data flow of FIG. 9(*a*) a seismic source having a broadband spectrum (such as trace (a) of FIG. 3) is actuated at step 1. The seismic energy is transmitted into, and propagates through, the earth. As the seismic energy propagates through the earth, the high frequency components of the seismic energy are attenuated as a result of the low-pass filter effect of the earth. The seismic energy incident on a receiver thus has a spectrum biased towards low frequencies—ie, a spectrum in which low frequency components have greater amplitudes than high frequency components, such as the spectrum of trace (b) or (c) of FIG. 3. The attenuation of high-frequency components is represented by step 2 of FIG. 9(*a*).

FIG. 9(*a*) shows the data flow for velocity domain acquisition and processing of seismic data. In this data flow, seismic data are acquired using a velocity-sensing receiver. A velocity-sensing receiver has a velocity sensitivity that is substantially uniform with frequency so that, when the seismic energy from the source is incident on a velocity-sensing receiver, the output from the receiver will be biased towards low frequencies as explained above. This is shown as step 3 of FIG. 9(*a*).

At step 4, the seismic data acquired by the velocity-sensing receiver are processed to obtain an image of the earth's subsurface. The seismic data are predominantly low frequency data velocity data, and the lack of high frequency components cannot be compensated during processing. Consequently, the resultant image obtained at step 5 has a low resolution, such as the image of FIG. 1(*a*).

In the data flow of the invention shown in FIG. 9(*b*) a seismic source having a broadband spectrum (such as trace (a) of FIG. 3) is actuated at step 11, and the earth acts as low pass filter as the resultant seismic energy propagates through the earth at step 12. Steps 11 and 12 of FIG. 9(*b*) correspond to steps 1 and 2 of FIG. 9(*a*), and description of these steps will not be repeated.

As explained above, in the present invention seismic data representing the acceleration wavefield are acquired and information about the earth's subsurface is obtained direct from the acquired seismic data. The data are acquired using an acceleration-sensing receiver, and this will have a sensitivity that increases with frequency as shown in FIG. 2. Thus, when the seismic energy is incident on a velocity sensor, the output from the sensor corresponds to trace (c) of FIG. 4 and has essentially a broadband spectrum. The high frequency component of the seismic energy emitted by the source has been recovered, after attenuation by the earth's low-pass filter effect, by the increased sensitivity at high frequencies of the acceleration-sensing receiver. This is shown as step 13 of FIG. 9(*b*).

At step 14, the seismic data acquired by the acceleration-sensing receiver are processed. In the processing step an image of the earth's subsurface is obtained direct from the acceleration seismic data, and the conventional step of transforming the acceleration seismic data to the velocity domain is not carried out.

As explained above, the increased high-frequency sensitivity of the acceleration sensor means that the sensor output will generally contain increased ambient noise at high frequencies, and the resulting higher levels of ambient noise need to be corrected for during processing. When typical velocity domain data are processed, a noise attenuation technique such as FK filtering is used to attenuate high frequency noise (and step 4 of FIG. 9(*a*) may include application of such a noise attenuation technique). An FK filtering technique is however ineffective at removing high frequency noise from acceleration domain data. This is because the FK filtering technique is based on the assumption that the noise falls off at high frequencies—but acceleration domain data show a generally flatter spectrum than velocity domain data, and the assumption underlying the FK technique is not valid for acceleration domain data.

The processing data flow of the present invention therefore preferably comprises a step of attenuating noise at high frequencies that will be effective at attenuating high frequency noise from acceleration domain data, and this is indicated in FIG. 9(*b*) as step 14. Step 14 preferably comprises filtering the high frequency noise from the acceleration domain data using a coherent adaptive noise filtering technique. Examples of suitable techniques are the ACONA (UK patent No. 2 309 082), LACONA, or ARANA techniques.

The frequency range over which noise attenuation is desirable will vary from one survey location to another since the frequencies used in generating the final subsurface image will vary between survey locations. Frequencies that allow seismic imaging of strata less than 20 m thick are generally considered to be "high frequencies" and, for a survey location with a typical average seismic wave velocity of 2000 m/s from surface to target, frequencies above 100 Hz will provide this resolution and are accordingly classified as "high frequencies". However, depending on the seismic wave velocity at the survey location is it possible that frequencies as low as 70 Hz or even 50 Hz would be termed "high frequencies".

Since the seismic data output from the acceleration sensor have a broadband spectrum, the resultant image obtained at step 15 has a high resolution, such as the image of FIG. 1(*b*). Thus, the present invention provides the recording and processing of acceleration data to produce higher bandwidth seismic images with higher resolution than the conventional velocity data.

Figure 10:
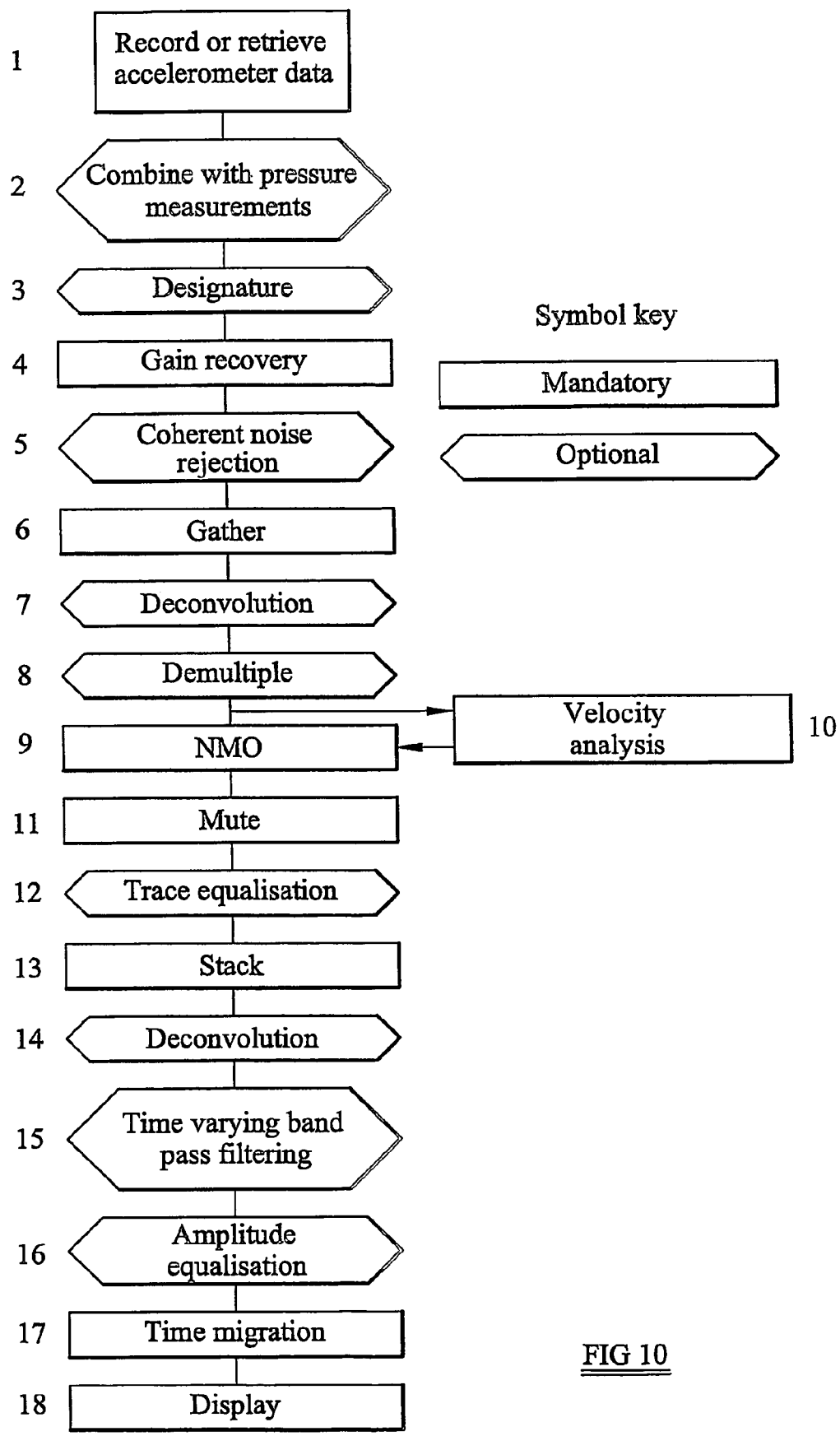
FIG. 10 is a block flow diagram of one method of processing acceleration data.

FIG. 10 is a block flow diagram of one method of processing acceleration data to obtain information about the earth's subsurface direct from the acceleration data. The steps denoted by rectangular boxes in FIG. 10 are required steps of this processing method, and the steps denoted by hexagonal boxes in FIG. 10 are optional, although preferred, steps of the processing method. The required steps of the method of FIG. 10 will be described first.

Initially at step 1 of FIG. 10 data representative of the acceleration wavefield are acquired. Alternatively, the method may be applied to pre-existing data, in which case step 1 would comprise retrieving data representative of the acceleration wavefield from storage. It is assumed for the subsequent description that the data are in the form of conventional seismic data traces.

At step 4, gain recovery is applied to the traces. At step 6 the traces are sorted into gathers, for example common receiver gathers.

At step 9 each trace is corrected for the source-receiver offset—that is, each trace is corrected so as to estimate the trace that would have been obtained if the source and receiver had been co-incident. In FIG. 10, step 9 is shown as a conventional normal moveout correction using a velocity obtained by a velocity analysis at step 10, but the method is not limited to this particular method of correcting for offset. If velocity information is already available for the survey location, step 10 may be omitted.

At step 11 the traces are muted. The traces are then stacked at step 13, and undergo time migration at step 17. Finally the results are displayed at step 18 (and additionally or alternatively may be stored for subsequent retrieval).

The optional steps shown in FIG. 10 will now be described.

If the acceleration data were acquired simultaneously with pressure data in a marine seismic survey, the acceleration data may be combined with the pressure data at step 2. This allows the up-going and down-going constituents of the wavefield at the receivers to be determined.

The seismic source used to acquire the data will have a defined source signature. Step 3 is a designature step, that removes the effect of the signature of the seismic source from the acceleration data (or from the combined pressure and acceleration data).

Step 5 is a step of filtering coherent noise (usually waterborne noise in data acquired in a marine survey) from the traces using a coherent noise filtering technique. This step eliminates coherent noise which would otherwise interfere with the coherent signal.

Step 7 is a deconvolution step. Step 8 is a demultiple step, applied in the case of data acquired at a receiver in a water column to remove events that involve multiple passes through the water column.

Step 12 is a trace equalisation step.

Step 14 is a second deconvolution step, but applied to the stacked traces. This step may be applied as well as step 7. Deconvolution steps have two purposes: attenuation of very short period reverberations, and whitening of the signal spectrum. The choice of parameters is usually a compromise between the two purposes. The post-stack deconvolution of step 14 is most often of the mildly spectral whitening type, to try to broaden the bandwidth before display.

The post-stack deconvolution step, step 14, may have the unwanted effect of boosting high-frequency noise in the data. The post-stack deconvolution of step 14 is therefore preferably followed by applying, at step 15, a time-varying band-pass filter to the data. This filter trims the bandwidth of the data to those frequencies dominated by the signal rather than by the noise.

Finally, step 16 comprises a step of equalising the amplitudes of the stacked traces.

It should be noted that FIG. 10 illustrates only one possible implementation of the method of the invention of obtaining information about the earth's subsurface direct from acceleration data. The invention is not however limited to the method of FIG. 10.

Figure 11:
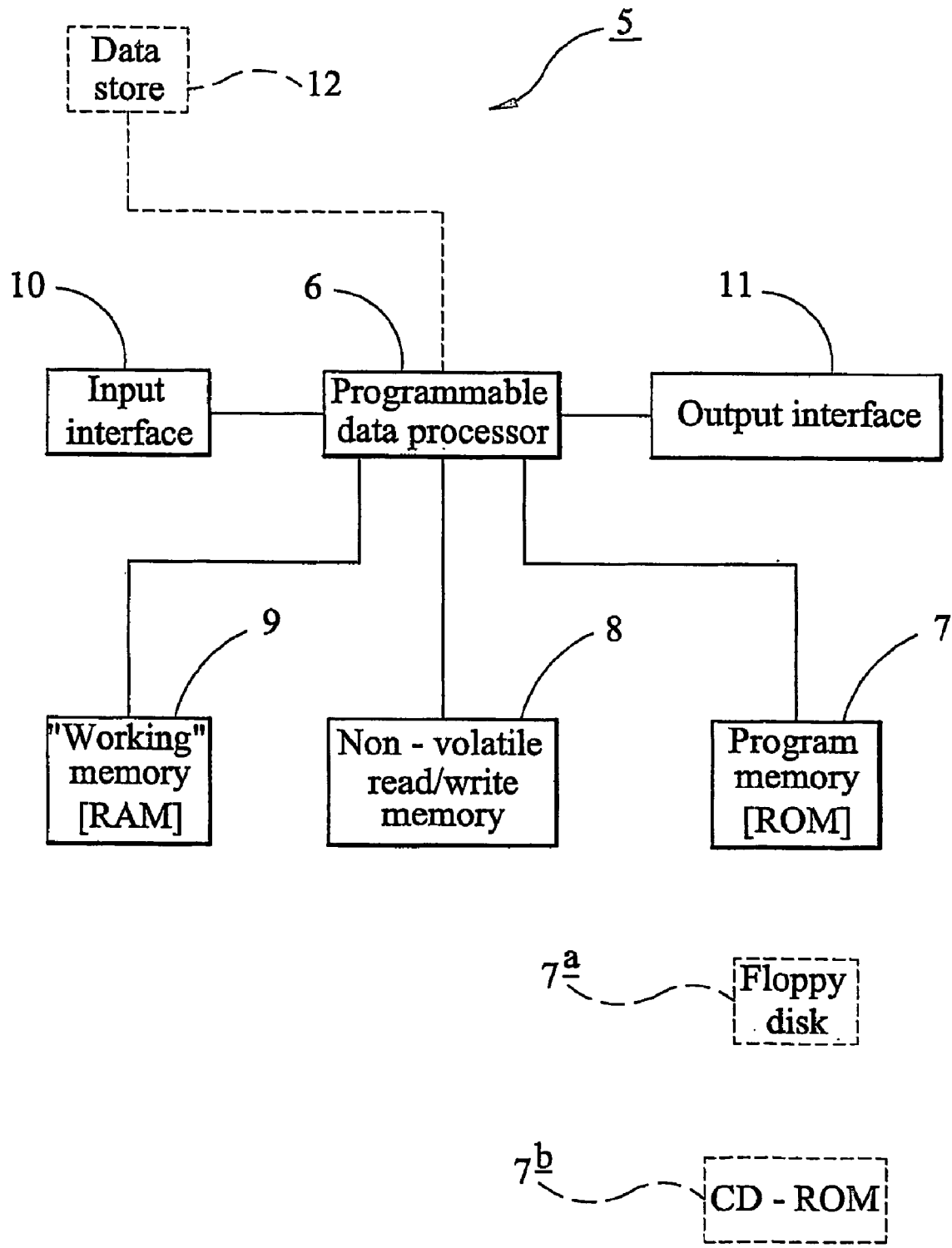
FIG. 11 is a block schematic diagram of an apparatus according to the present invention.

FIG. 11 is a schematic block diagram of a programmable apparatus 5 according to the present invention. The apparatus comprises a programmable data processor 6 with a programme memory 7, for instance in the form of a read-only memory (ROM), storing a programme for controlling the data processor 6 to perform any of the processing methods described above. The apparatus further comprises non-volatile read/write memory 8 for storing, for example, any data which must be retained in the absence of power supply. A "working" or scratch pad memory for the data processor is provided by a random access memory (RAM) 9. An input interface 10 is provided, for instance for receiving commands and data. An output interface 11 is provided, for instance for displaying information relating to the progress and result of the method. Seismic data for processing may be supplied via the input interface 10, or may alternatively be retrieved from a machine-readable data store 12.

The programme for operating the system and for performing the method described hereinbefore is stored in the programme memory 7, which may be embodied as a semi-conductor memory, for instance of the well-known ROM type. However, the programme may be stored in any other suitable storage medium, such as magnetic data carrier 7*a*, such as a "floppy disk" or CD-ROM 7*b*.

Figure 12:
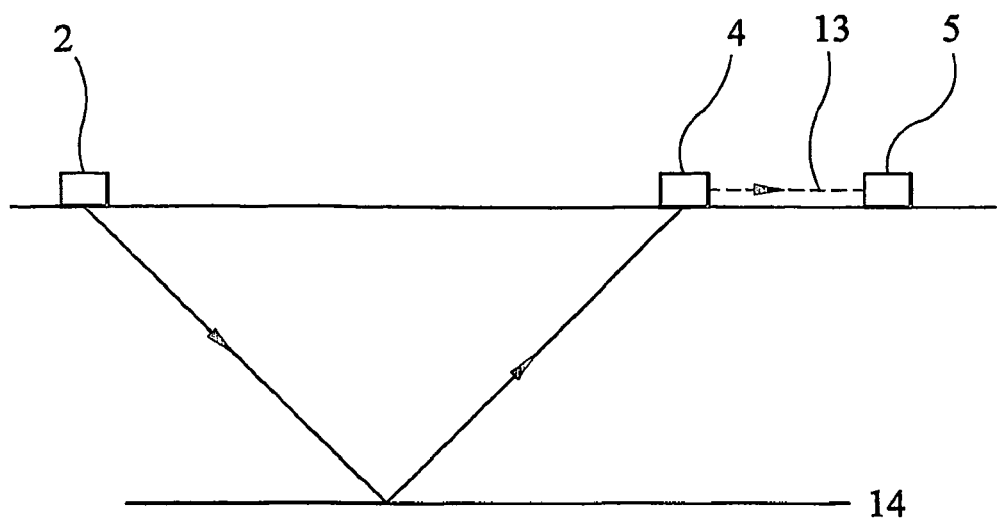
FIGS. 12(a) to 12(d) show seismic surveying arrangements incorporating an apparatus of FIG. 11.
Figure 12:
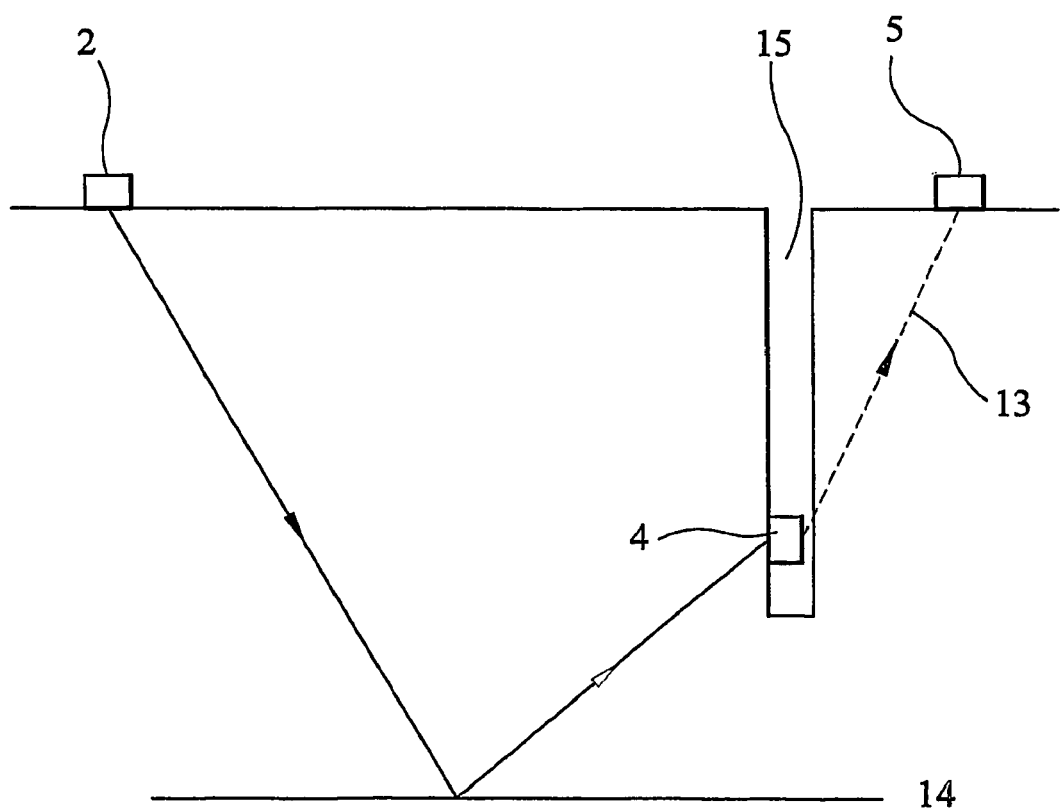

FIGS. 12(*a*) to 12(*d*) show seismic surveying arrangements of the invention. Each of these figures shows only one seismic source and one seismic receiver, for simplicity of description. However, a practical seismic surveying arrangement will generally have a receiver array containing a plurality of receivers and may also have a plurality of seismic sources.

FIG. 12(*a*) shows a first seismic surveying arrangement of the invention. This is a land-based seismic surveying arrangement. The seismic surveying arrangement of FIG. 12(*a*) has a seismic source 2 and a seismic receiver 4, laterally spaced from the seismic source, for acquiring seismic data representative of the acceleration wavefield. The seismic source 2 and seismic receiver 4 are each disposed at or on the earth's surface. A typical path of seismic energy from the source 2 to the seismic receiver 4, involving reflection at a geological feature denoted schematically as 14, is shown in FIG. 12(a).

The seismic surveying arrangement of FIG. 12(a) further comprises a processing apparatus for processing the acceleration data acquired by the receiver 4 so as to obtain information about the earth's subsurface direct from the acceleration data. The processing apparatus 5 may be an apparatus as shown in FIG. 11. Acceleration data acquired by the receiver 4 are passed to the processing apparatus 5, and this is denoted by the path 13. The acceleration data may, for example, be passed in real time or near real time to the processing apparatus 5 over a link such as an electrical, wireless or optical link. Alternatively, acquired acceleration data may be stored in the receiver 4 and subsequently retrieved for input into the processing apparatus.

FIG. 12(b) shows a second seismic surveying arrangement of the present invention. This is again a land-based seismic surveying arrangement. This generally corresponds to the seismic surveying arrangement of FIG. 12(a), except that the receiver 4 is disposed within a borehole 15. The remaining features of the seismic surveying arrangement of FIG. 12(b) correspond to those of the seismic surveying arrangement of FIG. 12(a) and their description will not be repeated.

Figure 12C:
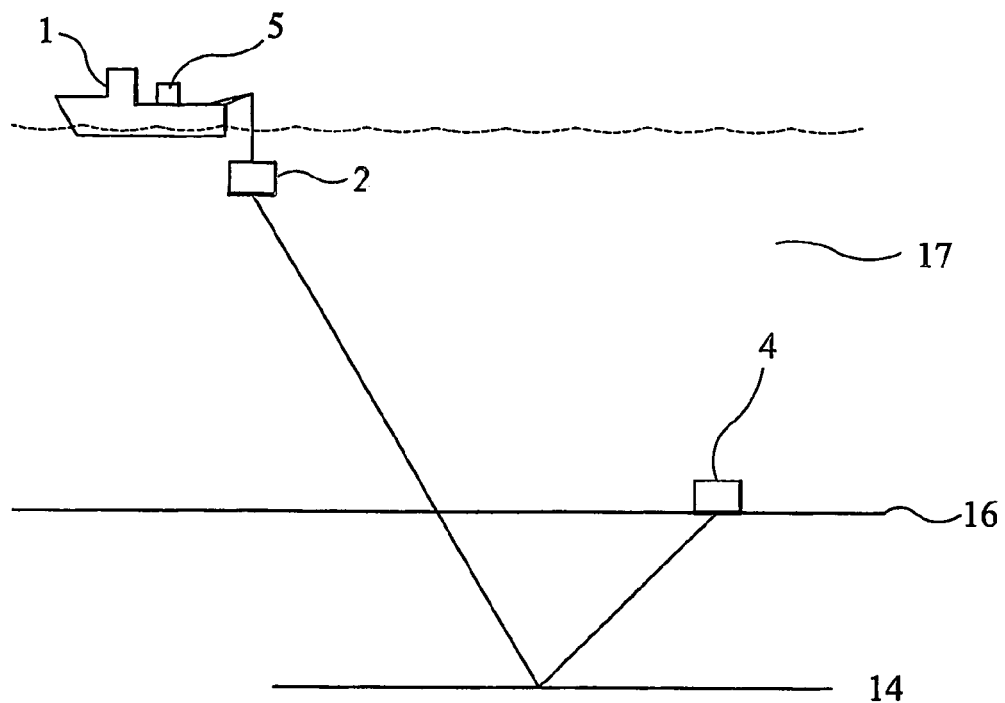

FIG. 12(c) shows a third seismic surveying arrangement of the present invention. This is a marine seismic surveying arrangement. The seismic surveying arrangement of FIG. 12(c) has a seismic source 2 and a seismic receiver 4, laterally spaced from the seismic source, for acquiring seismic data representative of the acceleration wavefield. The seismic source 2 is disposed within a water column 17, for example is suspended from a survey vessel 1. The seismic receiver 4 is disposed at the base 16 of the water column and may be, for example, an Ocean Bottom Cable. A typical path of seismic energy from the source 2 to the seismic receiver 4, involving reflection at a geological feature denoted schematically as 14, is shown in FIG. 12(c).

The seismic surveying arrangement of FIG. 12(c) further comprises a processing apparatus for processing the acceleration data acquired by the receiver 4 so as to obtain information about the earth's subsurface direct from the acceleration data. The processing apparatus 5 may be an apparatus as shown in FIG. 11. The processing apparatus 5 is shown as disposed on the survey vessel 1 in FIG. 12(c), but the processing apparatus 5 may be located elsewhere such as, for example, on another vessel or at a base on land. Acceleration data may be passed from the receiver 4 to the processing apparatus 5 in any of the ways described above.

Figure 12D:
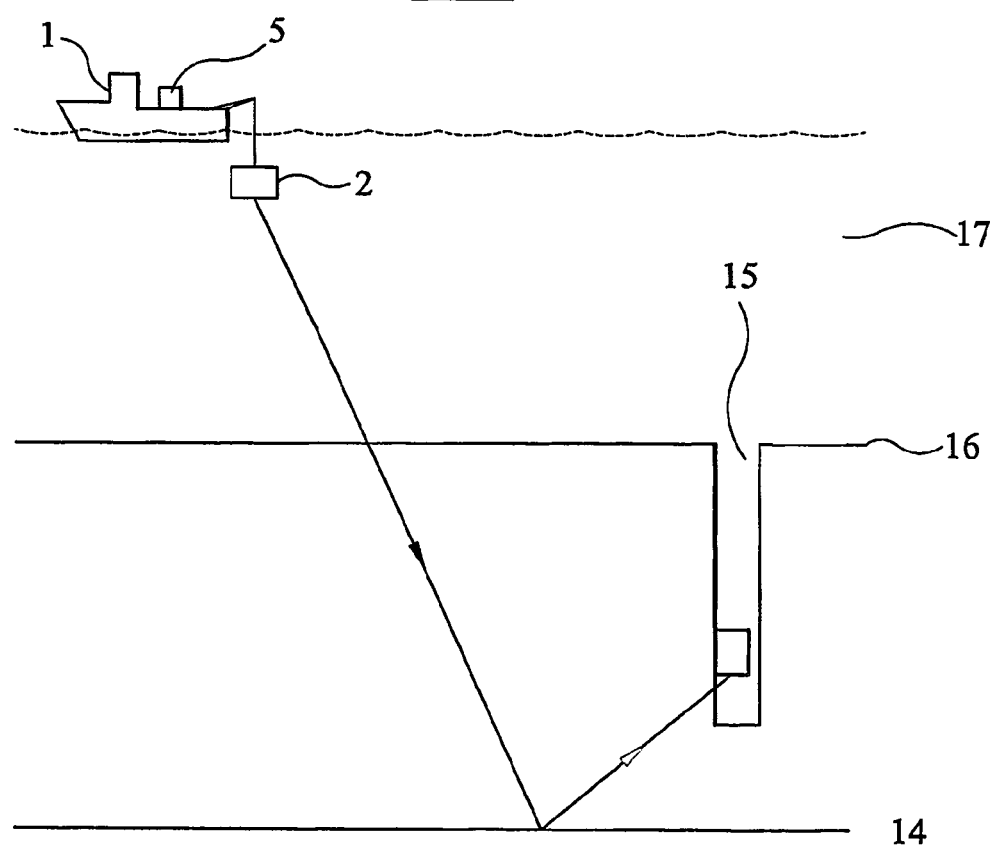

FIG. 12(d) shows a fourth seismic surveying arrangement of the present invention. This is a marine-based seismic surveying arrangement. This generally corresponds to the seismic surveying arrangement of FIG. 12(c), except that the receiver 4 is disposed within a borehole 15. The remaining features of the seismic surveying arrangement of FIG. 12(d) correspond to those of the seismic surveying arrangement of FIG. 12(c) and their description will not be repeated.

The invention claimed is:

1. A method, comprising:
   acquiring, or retrieving from storage, one or more acceleration wavefield traces;
   applying a gain recover to the acceleration wavefield traces;
   applying a normal moveout correction to the gain recovered acceleration wavefield traces;
   muting the normal moveout corrected acceleration wavefield traces;
   stacking the muted acceleration wavefield traces; and
   applying, using a processor, a time migration to the stacked acceleration wavefield traces.

2. An apparatus, comprising:
   an input interface for receiving one or more acceleration wavefield traces;
   a data processor; and
   memory comprising program instructions executable by the processor to:
      acquire the acceleration wavefield traces;
      apply a gain recover to the acceleration wavefield traces;
      apply a normal moveout correction to the gain recovered acceleration wavefield traces;
      mute the normal moveout corrected acceleration wavefield traces;
      stack the muted acceleration wavefield traces; and
      apply a time migration to the stacked acceleration wavefield traces.

3. A seismic surveying arrangement comprising:
   a seismic source for emitting seismic energy;
   a seismic receiver for acquiring seismic data representative of the acceleration wavefield traces, the seismic receiver being spaced from the seismic source; and
   an apparatus as claimed in claim 2 for processing the acceleration wavefield traces acquired by the receiver.

4. A seismic surveying arrangement as claimed in claim 3 wherein the seismic source and the receiver are each disposed at or on the earth's surface.

5. A seismic surveying arrangement as claimed in claim 3 wherein the seismic source is disposed at or on the earth's surface and the receiver is disposed within a borehole.

6. A seismic surveying arrangement as claimed in claim 3 wherein the seismic source is disposed in a water column and the receiver is located at the base of the water column.

7. A seismic surveying arrangement as claimed in claim 3 wherein the seismic source is disposed in a water column and the receiver is disposed within a borehole.

8. The method of claim 1, further comprising removing an effect of a signature of the source used to acquire the acceleration wavefield traces.

9. The method of claim 1, further comprising removing coherent noise from the gain recovered acceleration wavefield traces.

10. The method of claim 1, further comprising applying a demultiple algorithm to the gain recovered acceleration wavefield traces to remove events that involve multiple passes through a water column in which a receiver used to acquire the acceleration wavefield traces is disposed.

11. The method of claim 1, further comprising applying a trace equalization algorithm to the muted acceleration wavefield traces.

12. The method of claim 1, further comprising applying a pre-stack deconvolution algorithm to the gain recovered acceleration wavefield traces to attenuate short period of reverberations.

13. The method of claim 1, further comprising applying a post-stack deconvolution algorithm to the stacked acceleration wavefield traces to whiten a signal spectrum.

14. The method of claim 13, further comprising applying a time-varying bandpass filter to the stacked acceleration wavefield traces.

15. The method of claim 1, further comprising equalizing amplitudes of the stacked acceleration wavefield traces.

16. A method, comprising:
   acquiring, or retrieving from storage, seismic data representative of only acceleration wavefield traces;
   applying a gain recover to the seismic data;

applying a normal moveout correction to the gain recovered seismic data;
muting the normal moveout corrected seismic data;
stacking the muted seismic data; and applying, using a processor, a time migration to the stacked seismic data.

* * * * *